United States Patent
Powell

(10) Patent No.: US 7,998,225 B2
(45) Date of Patent: Aug. 16, 2011

(54) METHODS OF PURIFYING BIODIESEL FUELS

(76) Inventor: Scott W. Powell, Aurora, CO (US)

( * ) Notice: Subject to any disclaimer, the term of this patent is extended or adjusted under 35 U.S.C. 154(b) by 704 days.

(21) Appl. No.: 11/677,896

(22) Filed: Feb. 22, 2007

(65) Prior Publication Data

US 2008/0202021 A1    Aug. 28, 2008

(51) Int. Cl.
*C10L 1/08* (2006.01)
(52) U.S. Cl. ............... 44/308; 44/388; 44/605
(58) Field of Classification Search .......... 44/605, 44/388, 308; 508/295
See application file for complete search history.

(56) References Cited

U.S. PATENT DOCUMENTS

| | | | |
|---|---|---|---|
| 284,862 A * | 9/1883 | Lackersteen | 205/352 |
| 2,182,145 A | 12/1939 | Eddy | |
| 2,732,944 A | 1/1956 | Hays | |
| 3,340,175 A | 9/1967 | Mehl | |
| 3,788,967 A | 1/1974 | Kawahata et al. | |
| 3,793,173 A | 2/1974 | Kawahata et al. | |
| 3,925,176 A | 12/1975 | Okert | |
| 3,966,567 A | 6/1976 | Pace et al. | |
| 4,036,726 A | 7/1977 | Gale et al. | |
| 4,119,520 A | 10/1978 | Paschakarnis et al. | |
| 4,125,467 A | 11/1978 | Haddad et al. | |
| 4,176,038 A | 11/1979 | Moeglich | |
| 4,293,400 A | 10/1981 | Liggett | |
| 4,321,125 A | 3/1982 | Nazarian et al. | |
| 4,329,211 A * | 5/1982 | Plantes et al. | 205/755 |
| 4,450,060 A | 5/1984 | Gonzalez | |
| 4,623,436 A | 11/1986 | Umehara | |
| 4,708,809 A * | 11/1987 | Davis | 508/295 |
| 4,770,755 A | 9/1988 | Valanti et al. | |
| 4,790,923 A | 12/1988 | Stillman | |
| 4,872,959 A | 10/1989 | Herbst et al. | |
| 4,919,775 A | 4/1990 | Ishigaki | |
| 5,013,435 A | 5/1991 | Rider et al. | |
| 5,043,050 A | 8/1991 | Herbst | |
| 5,227,071 A | 7/1993 | Torline et al. | |
| 5,248,424 A | 9/1993 | Cote et al. | |
| 5,302,273 A | 4/1994 | Kemmerer | |
| 5,423,962 A | 6/1995 | Herbst | |
| 5,525,126 A | 6/1996 | Basu et al. | |
| 5,549,812 A | 8/1996 | Witte | |
| 5,571,399 A | 11/1996 | Allen | |
| 5,611,907 A | 3/1997 | Herbst et al. | |
| 5,741,426 A | 4/1998 | McCabe et al. | |
| 5,804,062 A | 9/1998 | Wyness | |
| 5,866,019 A | 2/1999 | Wyness | |
| 5,928,490 A | 7/1999 | Sweeney | |
| 5,928,493 A | 7/1999 | Morkovsky et al. | |
| 5,985,139 A | 11/1999 | Zoeller | |
| 6,139,710 A | 10/2000 | Powell | |
| 6,171,498 B1 | 1/2001 | Fassbender et al. | |
| 6,238,546 B1 | 5/2001 | Knieper et al. | |
| 6,325,916 B1 | 12/2001 | Lambert et al. | |
| 6,346,197 B1 | 2/2002 | Stephenson et al. | |
| 6,358,398 B1 | 3/2002 | Halldorson et al. | |
| 6,406,629 B1 | 6/2002 | Husain et al. | |
| 6,471,869 B1 | 10/2002 | Yanou et al. | |
| 6,488,835 B1 | 12/2002 | Powell | |
| 6,645,385 B2 | 11/2003 | Krulik et al. | |
| 6,689,271 B2 | 2/2004 | Morkovsky et al. | |
| 6,719,894 B2 | 4/2004 | Gavrel et al. | |
| 6,755,970 B1 | 6/2004 | Knappe et al. | |
| 6,855,838 B2 | 2/2005 | Haas et al. | |
| 6,890,451 B2 | 5/2005 | Sapienza et al. | |
| 6,965,044 B1 | 11/2005 | Hammond et al. | |
| 7,008,538 B2 | 3/2006 | Kasparian et al. | |
| 7,264,732 B2 | 9/2007 | Bradley | |
| 7,297,279 B2 | 11/2007 | Johnson et al. | |
| 7,381,323 B2 | 6/2008 | Umezawa et al. | |
| 7,404,900 B2 | 7/2008 | Bradley | |
| 7,410,584 B2 | 8/2008 | Devine | |
| 7,449,117 B2 | 11/2008 | Nakayama | |
| 2002/0088710 A1 | 7/2002 | Powell | |
| 2003/0121864 A1 | 7/2003 | Kin et al. | |
| 2004/0188348 A1 | 9/2004 | Yamasaki et al. | |
| 2005/0045534 A1 | 3/2005 | Kin et al. | |
| 2005/0081435 A1* | 4/2005 | Lastella | 44/605 |
| 2005/0120621 A1* | 6/2005 | Lawson et al. | 44/388 |
| 2005/0262760 A1 | 12/2005 | Lawson et al. | |

(Continued)

FOREIGN PATENT DOCUMENTS

AU    80591/82    9/1982

(Continued)

OTHER PUBLICATIONS

Amended Statement of Grounds and Particulars related to Australian Patent 738707 (similar to that previously submitted), 11 pages.

(Continued)

*Primary Examiner* — Ellen M McAvoy
*Assistant Examiner* — Latosha Hines
(74) *Attorney, Agent, or Firm* — Sheridan Ross, P.C.

(57) ABSTRACT

The invention provides methods of synthesizing and purifying methyl esters and specifically biodiesel fuels. The methods include acid-catalyzed transesterification of a triglyceride source followed by formation of an acidic emulsion that is subjected to an electric field to break the emulsion and recover the purified methyl esters. After recovery, the purified methyl esters may be used as a highly purified and stable biodiesel fuel without further treatment. The electric field may be efficiently applied to the acidic emulsion in an electrochemical reactor such as an electrocoagulation chamber.

20 Claims, No Drawings

U.S. PATENT DOCUMENTS

| | | |
|---|---|---|
| 2005/0274606 A1 | 12/2005 | Powell |
| 2006/0080891 A1 | 4/2006 | Ghosh et al. |
| 2006/0111600 A1 | 5/2006 | Mecham |
| 2007/0278152 A1 | 12/2007 | Musale |

FOREIGN PATENT DOCUMENTS

| | | |
|---|---|---|
| AU | 569026 | 1/1988 |
| AU | 685260 | 1/1998 |
| AU | 707432 | 7/1999 |
| AU | 721834 | 7/2000 |
| DE | 1526687 | 2/1970 |
| DE | 2832664 | 2/1980 |
| EP | 803274 | 10/1997 |
| GB | 1526687 | 9/1978 |
| GB | 2172815 | 10/1986 |
| GB | 2272171 | 5/1994 |
| JP | 61164695 | 7/1986 |
| JP | 7-116667 | 5/1995 |
| WO | WO 94 00860 | 1/1994 |
| WO | WO 96/17667 | 6/1996 |
| WO | WO 96/40591 | 12/1996 |
| WO | WO 98/17589 | 4/1998 |
| WO | WO 01/53568 | 7/2001 |
| WO | WO 03/078035 | 9/2003 |

OTHER PUBLICATIONS

Amended Statement of Grounds and particulars related to Australian Patent 738707 (related to U.S. Appl. No. 10/050,725), 5 pages.

Barkley, Naomi P., et al, "Emerging Technology Summary—Electro-Pure Alternating Current Electrocoagulatioh", Superfund Innovative Technology Evaluation, EPA/640/S-937507, Sep. 1993.

Brian Grigg; AWWA Trade Waste Interest Group and Institute for Sustainable Futures—Joint Seminar, Sep. 14-15, 1999; 6 pages.

Cardia Technologies Ltd.; Electrocoagulation Advertisement; 7 pages, Mar. 2004.

Electro-Coagulation—Water Treatment Technology; 6 pages Sep. 1999.

Electrocoagulation Systems; 9 pages 1999.

Fletcher et al., "Industrial Electochemistry", Second Edition, Chapman-Hall, 1990, Great Britian, pp. 337-338 and 560.

Holt et al., "Electrocoagulation: A Technology-Oriented Review", 61 pages 1999.

Horn, F.P., "Informational Memorandum for the Deputy Secretary of Agriculture of the U.S. Re: Electrocoagulation," Dec. 11, 1995.

Petition related to a request for Invalidation against Korean Patent Application No. 395731 (related to U.S. Appl. No. 10/050,725), 18 pages.

Scott Wade Powell; Vortex™ Water Systems, LLC—Electrocoagulation—A Technical Analysis; 25 pages 1995.

Smith, C.E., "Applications of New Concepts of Physical-Chemical Wastewater Treatment," Progress in Water Technology, vol. 1, Pergamon Press, edited by W.W. Eckenfelder, et al., paper presented at Vanderbilt University, sponsored by The International Association on Water Pollution Research & The American Institute of Chemical Engineers, Sep. 18-22, 1972.

Statement of Grounds and particulars related to Australian Patent 738707 (related to U.S. Appl. No. 10/050,725), 4 pages.

Vortex™ Water Systems, LLC—Advertisement; 6 pages 1999.

Vortex™ Water Systems, LLC—Operating Instructions Manual; 15 pages 1998.

Woytowich, David L., et al., "Electrocoagulation (CURE) Treatment of Ship Bilgewater for the U.S. Coast Guard in Alaska," MTS Journal, vol. 27, No. 1, 63-67. No month available.

U.S. Appl. No. 12/255,903, filed Oct. 22, 2008.

U.S. Appl. No. 12/276,078, filed Nov. 21, 2008.

"Clarifiers", Clarifier, Waste Treatment Clarifier, clarifiers, Met-Chem, Inc. web page, as early as Mar. 18, 2007, available at http://www.metchem.com/clarifier.htm, printed on Oct. 21, 2008, pp. 1-2.

"Memcor® Membranes. Quality. Reliability. Experience.", MEMCOR Products—Ultrafiltration and Microfiltration Water and Wastewater Systems, Siemens web page, available at http://watersiemens.com/en/productlines/memcor_products/Pages/defaultaspx?g . . . , printed on Oct. 20, 2008, p. 1.

"Reverse Osmosis", Reverse Osmosis—Wikipedia, the free encyclopedia web page, as early as Apr. 4, 2004, available at http://en.wikipedia.org/wiki/Reverse—osmosis, printed on Oct. 22, 2008, pp. 1-6.

"Sewage treatment", Sewage treatment—Wikipedia, the free encyclopedia web page, as early as Jan. 24, 2004, available at http://en.wikipedia.org/wiki/Sewage_treatment, printed on Oct. 22, 2008, pp. 1-10.

"Ultrafiltration", Ultrafiltration—Wikipedia, the free encyclopedia web page, available at http://en.wikipedia.org/wiki/Utrafiltration, printed on Oct. 22, 2008, p. 1.

"Ultrafiltration", ultrafiltration: Definition from Answers.com website, as early as May 26, 2005, available at http://www.answers.com/topic/ultrafiltration, printed on Oct. 20, 2008, p. 1.

"Water purification", Water purification—Wikipedia, the free encyclopedia web page, as early as May 9, 2004, available at http://en.wikipedia.org/wiki/Water—purification, printed on Oct. 22, 2008, pp. 1-5.

* cited by examiner

METHODS OF PURIFYING BIODIESEL FUELS

FIELD OF THE INVENTION

The invention relates to improved methods of making biodiesel fuels and biodiesel fuel blends from vegetable oils and other non-petroleum oils as well as the fuels produced by these methods.

BACKGROUND OF THE INVENTION

The United States is currently tied to energy derived from petroleum resources. According to the Energy Information Administration (EIA), 68% of petroleum oil consumed by the U.S. is used to fuel our nation's transportation needs. Throughout much of the twentieth century the U.S. was able to depend on ample domestic supplies of petroleum, however, domestic oil production in the contiguous states peaked in 1970 and has been declining ever since. The U.S. economy relies heavily on diesel-powered vehicles for transportation of people and goods and diesel fuel constitutes more than 25% of the nation's total fuel use. Diesel engines provide the power to move 94% of all freight in the U.S. as well as 95% of all transit buses and heavy construction machinery. The nation consumes more than 90,000 gallons of diesel fuel every minute.

More than 66% of the nation's diesel fuel is refined from imported oil and this percentage is growing at a rate of 1% per year. There is a need for the U.S. to develop renewable alternatives to diesel fuel to diversify the available alternatives to petroleum fuels for transportation. Biodiesel is such a renewable and domestically produced diesel fuel alternative that directly displaces petroleum diesel fuel. Biodiesel is a very desirable energy source because it is the most effective liquid fuel use of the abundant natural resource, sunlight, as evidenced by its excellent energy balance—biodiesel yields 3.2 units of fuel product energy for every unit of fossil energy consumed in its life cycle. Biodiesel can be produced from any triglyceride oil and may be blended with diesel fuel in any proportion.

Biodiesel is most often produced by transesterification, which exchanges the alkoxy group of an ester compound by another alcohol in the presence of acid or base catalyst. The transesterification process in biodiesel production is the reaction of a triglyceride with an alcohol to form esters (the biodiesel fuel) and glycerol (a by-product). The most common form of biodiesel is methyl esters of long chain fatty acids, although ethyl ester biodiesel exits as well. The biodiesel esters produced in this fashion can be injected as fuels into diesel engines either pure or blended with fossil diesel.

The transesterification reaction may be catalyzed by either acids or bases, and the base-catalyzed route is the most popular because of the reaction efficiency and mild operating conditions. The base catalyst used for transesterification of the oil to produce biodiesel commercially is typically sodium hydroxide or potassium hydroxide. A mixture of alcohol and the base catalyst is prepared and added to the oil or fat. Excess alcohol is normally used to ensure total conversion of the fat or oil into the corresponding esters. Care must be taken to monitor the amount of water and free fatty acids in the incoming oil or fat. If the free fatty acid level or water level is too high it may cause problems with soap formation and the separation of glycerin/glycerol by-products downstream.

After the reaction, the unreacted methanol, or ethanol, and the catalyst must be removed to purify the methyl ester. Reaction time for conventional batch processes of making biodiesel typically ranges from 1 to 8 hours, and separation time for contaminant removal adds another 8 to 16 hours. The time and expense of this further processing is the primary reason that conventionally produced biodiesel fuels are typically not cost competitive with petroleum diesel fuel. The production cost of most biodiesel fuels is more than 1.5 times greater than that of petroleum derived diesel. In addition to the expense, the production and wash cycles generate many gallons of waste water that must be treated in onsite sewer plants or in publicly owned treatment works. This waste water treatment limits where the plants can be built. As a result, production levels of biodiesel are determined by the number and size of tanks used within a given facility, as well as available land area.

Accordingly, there is a need in the industry for biodiesel production methods that reduce the time and costs of the esterification and decontamination processes while increasing the production of useable byproducts, such as animal feeds and fertilizer. Preferably, these processes would increase the yield and purity of the biodiesel product while reducing the production of wastewater and toxic or environmentally harmful byproducts. Additionally the processes should reduce the time and space requirements below those needed for the traditional processing means.

SUMMARY OF THE INVENTION

The methods of the present invention overcome the limitations of the most common biodiesel production methods described above by combining an acidic transesterification reaction with electrochemical methods of separating the reaction by-products and contaminants from the fuel to produce a highly-purified, high energy value biodiesel fuel. These methods reduce the time and facility-space requirements for the biodiesel production processes, significantly increasing the production through-put and lowering the cost of the fuel products.

In one aspect, these methods include the initial acidification of the raw vegetable oils. In the transesterification of a triglyceride with alcohol to form esters and glycerol, acids act to catalyse the reaction by donating a proton to the alkoxy group prior to introduction of any traditional hydroxide catalysts. Acidification eliminates the need for traditional "de-gumming" techniques and provides an initial glycerol separation from the fatty acid chains. Addition of an alcohol to the acidified oil converts a substantial quantity of free fatty acids into stabilized, methyl ester fuels.

In another aspect, these methods include a second esterification period, wherein a strong base is added to the oil to drive the esterification reaction further towards completion and increase the yield of fuel products. Glycerin produced during this reaction period is continually removed, which drives the esterification reaction to greater than about 97% total triglyceride conversion. Esterification may be completed in as little as one hour using these procedures, as opposed to the typical eight hour reaction time used in conventional chemical esterification processes.

In another aspect, these basic and acidic esterification periods are combined serially. Coupling the use of an acidified oil with a base-catalyzed esterification period creates a two-stage esterification process in which glycerin byproducts may be continually removed as formed, thereby driving the chemical reaction towards production of the methyl ester products. The use of acidified oil also permits the use of a single reaction/esterification vessel, thereby allowing complete chemical control of the esterification process.

In another aspect, the esterified oil is separated from the reaction byproducts and impurities to form a fully washed and stable fuel that requires no further treatment or separation of water and produced solids. This wash process includes mixing the esterified oil with one or more salts and flowing the mixture through an electric field. When subjected to the electric field, the salts react with the fuel, and contaminants within the fuel, to remove dissolved solids and produce a fully washed biodiesel fuel. These salts could not be utilized in the washing procedures of the conventional biodiesel production processes because saponification of any remaining hydroxides would occur. In the improved biodiesel production methodology of the present invention, the step of exposing the oil to an electric field makes the use of these salts possible during the purification and decontamination of the fuel.

In one aspect of the invention, an electric field is applied to the oil and salt mixture by flowing the liquid between an anode and a cathode of an electrochemical reactor. The electrical potential in the electrochemical reactor is provided between an anode and cathode. The particular construction of the reactor can be any one of many current designs known for other processes such as electrocoagulation as set forth below. In a preferred embodiment of the present invention, the electrochemical reactor comprises a chamber defined by a housing in which the anode and cathode are secured. The housing has a fluid inlet through which the liquid enters the housing and a fluid outlet through which the liquid is discharged from the housing after passing through the electric field.

Following the cleaning step, the resulting biodiesel fuel is virtually free of hydroxides, phosphorous, sulfur and metals, including copper. The electric field treatment also reduces ash content, neutralizes acidic values, removes remaining free glycerin and fully breaks any emulsion. The combined removal of these contaminants produces a biodiesel fuel of lower viscosity and less color than can be obtained using the conventional washing methods.

In a further aspect, a final separation of water and solids from the produced fuel oil may be accomplished using vacuum clarification, vacuum distillation, or both. Use of this technique prevents any water or particulates to remain with the fuel oil and also degasses the fuel oil, thereby removing any excess methanol from the oil.

In another aspect, the invention provides a clean and stable biodiesel fuel produced using various aspects of the production methodology described above.

DESCRIPTION OF THE INVENTION

The present invention provides methods for the production of clean, stable biodiesel fuels. In one embodiment, a two-stage esterification reaction is conducted on an oil containing triglycerides to form an esterified fuel oil. The processes can be conducted batchwise, or more preferably continuously, or in a combination using some batchwise steps and some continuous processing steps.

The oil feedstream for the esterification reaction may include a previously-isolated oil or may include the production of a raw, crushed oil from a non-petroleum source that is processed to separate organic solids, water and clarified raw oil. For example, canola seeds and plants may be used as a source of canola oil for esterification in the methods of the present invention. The canola plant material is crushed and solids (such as seed hull fragments) are separated from the water and raw oil. This initial separation is preferably conducted using a three-phase centrifugal decanter. Organic solids that are isolated may be returned to the crushing line for further extraction of the raw oils. The small amount of water recovered is sent to the wastewater treatment process and the captured oil is sent to raw oil holding or a surge tank for esterification.

The isolated oils used in the esterification processes may include organic and inorganic oils, and combinations of these. The oils may include vegetable oils or other non-petroleum oil sources, such as animal fats, grease or oils derived from the pyrolysis of woods or grasses, and may be edible or inedible. The oils from these diverse sources may also be natural or crude, partially or completely refined, or some combination thereof. Preferably, the oils are derived from plants (including natural, hybrid, or transgenic plants), such as vegetable oils including corn oil, canola oil, palm oil, sunflower oil, flax seed oil, safflower oil, tall oil, pine tree tall oil, hydrogenated oil, artificially hydrogenated oil, coconut oil, cottonseed oil, olive oil, palm kernel oil, peanut oil, soybean oil, linseed oil, tung oil, rapeseed oil, sesame oil, babassu oil, perilla oil, oiticica oil, castor oil, Chinese tallow tree oil, Physic nut oil, Cuphea seed oil, oil extracted from algae or micro-algae, oil derived from fruit, and hemp oil. Other suitable oils include bacterial oil, fungal oil, animal oil or grease, such as beef tallow, chicken fat oil, lard, fish oils, menhaden oil, waste grease, soapstock, recycled rendered feedstock oils, and rendered oil or grease generated during the refining of feedstock oils. Exemplary oils for use in the biodiesel production processes of the present invention include soybean oil, corn oil, canola oil, palm oil, sunflower oil, flax seed oil, safflower oil, cottonseed oil, olive oil, palm kernel oil, peanut oil, sesame oil and/or castor oil. The most preferred oil is canola oil, which may be isolated from crushed canola seed.

An oil temperature in the range of between about 25° C. and about 75° C., and more preferably between about 40° C. and about 60° C., is maintained throughout the esterification process. The temperature of the oil may be monitored and maintained within this range using any suitable means. In a preferred embodiment, sonic waves (30 kHz at 1 kw) are used to provide and/or maintain the required heat of reaction, which is between about 45° C. and about 55° C., as the rate of esterification of oil subjected to sonic waves is greatly increased. Raw oil from a crushing unit will typically have a temperature of approximately 50° C. making the transfer of raw oil directly from a crusher to the esterification steps particularly efficient. The esterification reactions are preferably conducted at low or atmospheric pressure.

Raw oil is introduced into an acid treatment tank where it is mixed with a strong acid. The acid is preferably introduced to the oil by means of a fine mist spray bar to effectively apply acid over the entire surface of the oil within the tank. Any sufficiently strong acid may be used to drive the desired reaction. Sulfuric acid ($H_2SO_4$), in a concentration of at least 95%, is the preferred acid for use in this acidification of the raw oil. The acid is added to the raw oil on a volumetric basis. For example, sulfuric acid is added to the raw oil at a volume of about 11 ml per liter of oil. The oil is gently mixed using mechanical stirring for a time between about 5 minutes and one hour. Using spray bar application of a strong acid to a gently agitated treatment tank, the raw oil can typically be mixed and acidified within approximately 30 minutes.

During the acidification, any glycerin and carbonaceous particles that are generated are preferably removed from the oil using a two-phase centrifuge. During centrifugation, particulates remain in, and flow with, the glycerin. The separated glycerin/carbon particulates are temporarily stored and may ultimately be blended with solid residues from a cleaning/crushing line for further extraction of raw oils that may have been retained in the separated material. This blended solids material may then be used or sold as animal feed.

The application of ultrasonic energy is also highly beneficial in settling the solids (following raw crushing) and within the esterification reaction tank.

The acid treated oil is transferred into a transesterification reaction tank. Because the transesterification reaction requires the addition of an alcohol, the transfer of the acidified oil typically includes measuring and pumping the oil such that a specific amount of oil and alcohol can be mixed in the transesterification tank, thereby optimizing the transesterification reaction yield and rate while minimizing the cost of reactants.

The oil in the transesterification tank is continuously agitated, preferably using a mechanical, gear driven electric motor at a speed less than about 30 rpm. The mechanical agitation rate should be no greater than is required to ensure an even temperature and mixing of chemicals. The temperature of the oil is maintained between about 25° C. and about 75° C. and preferably between about 45° F. and about 55° C. during the entire esterification period. When the oil has reached the reaction temperature range, an alcohol is added. The alcohol may be saturated or unsaturated, substituted or unsubstituted, branched or linear, including alcohols such as methanol, ethanol, propanol, iso-propanol, butanol, tert-butanol, pentanol, hexanol, heptanol, octanol, nonanol, and decanol. Exemplary alcohols include methanol, ethanol and isopropanol. Preferably, the alcohol is anhydrous methanol added at about 50 ml methanol per liter of oil. The oil will begin to esterify and this reaction is allowed to proceed for about 15 minutes.

At the end of this first stage of esterification, a strong base is added to the oil. Exemplary bases for use as catalysts in the remaining esterification reaction include sodium or potassium methoxide. Preferably, the base is potassium methoxide added to the oil-alcohol mixture at about 12 grams per liter of oil. Preferably, another addition of alcohol is also made at this time. For example, another 150 ml of anhydrous methanol per liter of oil, may be added at the time that the strong base is added to the oil. Because most of the available free fatty acids in the oil were previously converted to methyl-esters during the first 15-minute esterification period, the strong base catalyst is now available to react with the remaining triglycerides. This second esterification period is conducted for about 45 minutes, at the end of which a minimum of 97% of the fatty acids will have been converted to methyl-esters. The addition of a second portion of alcohol is important in promoting rapid conversion of fatty acids into methyl-esters. A complete reaction is possible using less base and alcohol, but the reaction time then requires hours instead of minutes and the total glycerin removed will be lower, significantly lowering the quality of the produced fuel. Preferably, this second portion of alcohol contains about 200 ml of methanol per liter of oil (or an equivalent amount of another alcohol).

The esterification may be continued for as long as desired, but is typically concluded within about three hours and is usually sufficiently complete within about one hour, equating to the first (15 minute) and second (45 minute) time periods.

During the esterification periods, the glycerin produced is removed from the reactants, preferably using a two-phase centrifuge to circulate oil from the tank. Use of the centrifuge to remove glycerin during the esterification period prevents any chemical equilibrium in the oil being formed, which severely slows or stops the esterification reaction. The finished oil typically has a pH of between 8.0 and 8.5 and a pH of the finished oil greater than neutral indicates that a complete esterification reaction has occurred.

Glycerin removed from the esterification tank is directed to a vacuum extraction unit for recovery of the alcohol. Since the glycerin has a temperature of about 50° C., a vacuum can be effectively used to volatize the alcohol with the vapor being condensed into a liquid. The recovered alcohol is then further processed through a molecular sieve to remove remaining water. The recaptured alcohol may be recycled for further use in esterification reactions. The remaining glycerin is then stored and used or sold as a feed additive.

Fuel oil from the esterification tank may be held in a storage tank for further processing or immediately prepared for exposure to an electrical field. Prior to exposing the oil to an electric field, the oil is mixed with an aqueous salt solution, preferably using a series of static mixers to ensure good mixing/emulsification. The salt solution contains water and a solution of at least one salt, preferably alkali metals and/or alkaline earth metal salts, such as, but not limited to, potassium chloride, sodium chloride, calcium chloride and sodium hydrosulphite. An acid, such as phosphoric acid, is also added to the salt solution in an amount sufficient to lower the pH of the oil to an acidic pH when the wash water is mixed with the oil. This acidification of the oil prevents saponification from occurring in the presence of the salt solution. The salts provide the conductivity necessary for effective electrical treatment of the oil. Salts such as calcium chloride, provide a chemical nucleus upon which contaminants from the oil can combine to form a solid flocculent. Salts such as sodium hydrosulphite bleach the oil, removing color through the removal of carotenes, phospholipids and ligands that would otherwise remain in the fuel oil, lowering the quality of the oil.

The blended oil/salt water emulsion is drawn into an electric field wherein dissolved solids, suspended solids, and the oil/salt water emulsion is broken. Generated solids from this reaction are attracted to and remain with the water phase. Contaminants within the fuel oil are removed, leaving a clean, stabilized fuel for immediate use or storage.

The electric field may be applied to the oil/salt water emulsion in any suitable electrochemical reactor that is adapted to apply an electric field to the oil mixture and cause the emulsion to break. The reactor includes a housing enclosing an anode and a cathode. The housing may be any shape but is typically designed to facilitate the application of an electric field to the oil as it flows through the reactor. Thus, the reactor also typically includes additional process equipment to control the flow of reactants and products to and from the reactor. Preferably, the direction of the fluid flow is from the anode to the cathode.

The anode may be made of any material that allows the flow of electrons, including, but not limited to metals such as copper, silver, gold, magnesium, zinc, aluminum, iron, nickel, tin; non-metals or combinations thereof (e.g., alloys or coated or multi-layered structures), such as carbon-based materials such as graphite; or combinations of metals and non-metal. The metals can be galvanized or formed in combination with oxygen or oxides. In a preferred embodiment, the anode is made of a copper alloy.

The cathode may be made of any material to which positively charged ions migrate when an electric current is passed, including, but not limited to a copper alloy, stainless steel, platinum, nickel, or iron, or alloys thereof. In a preferred embodiment, the cathode is formed of material that is attached to an interior surface of the housing.

Fluid flow velocity can be critical, in that it should provide
    enough time and thus exposure within the electric field
      to cause the emulsion to break facilitating the separation
      of the purified oil from the remaining impurities. Continuous processing systems may be designed to include two or more electro-chemical reactors, operating in parallel or in series.

The particular construction of the electrochemical reactor may be an electrocoagulation chamber as described in U.S. Pat. Nos. 6,139,710 and 6,488,835 and U.S. Patent Publication Nos. 2002-0088710 A1 and 2005-0274606 A1, all of which are incorporated herein, by reference. Most preferably, the treatment device used to break the fuel/salt water emulsion by the application of an electric field includes a housing having an upper portion and a lower portion, the upper portion defining a development chamber and the lower portion defining a reaction chamber; an inlet communicating with the housing at the reaction chamber to allow the flow of liquid into the housing; an outlet communicating with the reaction chamber to allow the flow of liquid out of the housing; a plurality of reaction plates disposed in the housing and extending substantially vertical within the reaction chamber, the plurality of reaction plates being spaced apart from one another creating gaps extending between adjacent reaction plates, the flow of liquid being in a flow direction upward through the gaps between the plurality of reaction plates, at least two reaction plate tabs integral with selected ones of the plurality of reaction plates, the reaction plate tabs having ends that may be isolated from the flow of liquid in the housing, and a source of power providing line voltage to the tabs in order to create an electrical field for the treatment within the reaction chamber.

The electric field may be generated from essentially any suitable direct current (DC) or alternating current (AC) source. In preferred embodiments, a direct current electric field is used. An electrical potential between the anode and cathode in the electrochemical reactor can be between about 1.5 volts and 12 volts with successful results, however much higher voltages can also be used as desired. This electrical potential in a device like one of the electrocoagulation chambers is measured in the gaps between the reaction plates.

Following exposure to an electric field, the mixture of oil, water and solids is directed to a supply tank for separation of the purified methyl ester solution from the water and solid components of the broken emulsion. This separation of the purified biodiesel fuel may be accomplished by any standard separation means that will effectively separate the fuel from the remaining aqueous or solid contaminants, such as by gravity separation. Preferably, the separation is conducted using a vacuum clarifier, which provides a greater efficiency and speed compared to standard gravity separation. An exemplary vacuum clarifier for use in this separation process is described in U.S. Pat. No. 5,741,426, which is incorporated herein, by reference.

In this preferred embodiment, the components of the broken emulsion, including the fuel, are drawn by vacuum into a barometric standoff tank of a vacuum clarifier and the fuel is clarified under vacuum. In this process, solids will not follow the water drawn off by vacuum. The fuel, being lighter than water, is extracted from the water phase and is also dehydrated because of the maintained vacuum. Separated solids are removed from the base of the vertical clarifier and disposed of or used as fertilizer. Separated water is removed from the column by gravity and may be returned to the processing facilities for use as wash water. Biodiesel fuel is removed from the tower by gravity and placed in a fuel storage tank.

The biodiesel fuel recovered from the vacuum clarification is a fully dehydrated fuel oil, free of solids. Water recovered from the vacuum clarifier is reusable, and any solids extracted from the clarifier require no special handling and are a by-product rather than a disposable waste.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiment described hereinabove is further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A method of preparing a biodiesel fuel from triglyceride oils comprising:
    mixing a triglyceride oil with a first acid to form an acidified oil comprising glycerin;
    removing the glycerin from the acidified oil to form a modified acidified oil;
    mixing the modified acidified oil with a first portion of alcohol to form an alcohol-oil mixture;
    mixing the alcohol-oil mixture with a base and a second portion of alcohol to form a methyl ester solution;
    mixing the methyl ester solution with a second acid to form an acidified methyl ester solution;
    mixing the acidified methyl ester solution with an aqueous salt solution to form an emulsion;
    exposing the emulsion to an electric field to form a broken emulsion; and,
    recovering a biodiesel fuel from the broken emulsion.

2. The method of claim 1, wherein the triglyceride oil is a vegetable oil selected from the group consisting of corn oil, canola oil, palm oil, sunflower oil, flax seed oil, safflower oil, tall oil, pine tree tall oil, coconut oil, cottonseed oil, olive oil, palm kernel oil, peanut oil, soybean oil, linseed oil, tung oil, rapeseed oil, sesame oil, babassu oil, perilla oil, oiticica oil, castor oil, Chinese tallow tree oil, Physic nut oil, Cuphea seed oil, hemp oil and combinations thereof.

3. The method of claim 1, wherein the triglyceride oil is selected from the group consisting of bacterial oil, fungal oil, animal oil, grease, beef tallow, chicken fat oil, lard, fish oils, menhaden oil, soapstock and combinations thereof.

4. The method of claim 1, wherein the triglyceride oil is a clarified raw oil derived from a non-petroleum source processed to separate organic solids and water from the oil.

5. The method of claim 1, further comprising:
    adjusting the temperature of the acidified oil to a temperature between about 45° C. and about 55° C. using sonic waves.

6. The method of claim 1, wherein the first acid is sulfuric acid.

7. The method of claim 1, wherein the glycerin is removed from the acidified oil using a two-phase centrifuge.

8. The method of claim 1, wherein the alcohol is selected from the group consisting of methanol, ethanol, propanol, iso-propanol, butanol, tert-butanol, pentanol, hexanol, heptanol, octanol, nonanol, decanol and combinations thereof.

9. The method of claim 1, wherein the base is potassium methoxide.

10. The method of claim 1, wherein the methyl ester solution is mixed for about one hour.

11. The method of claim 1, wherein the methyl esters solution is mixed until the pH of the solution is greater than pH 7.

12. The method of claim 1, wherein the second acid and the aqueous salt solution are mixed with the solution of methyl esters simultaneously.

13. The method of claim 1, wherein the salt is selected from the group consisting of potassium chloride, sodium chloride, calcium chloride, sodium hydrosulphite and combinations thereof.

14. The method of claim 1, wherein the second acid is phosphoric acid.

15. The method of claim 1, wherein the emulsion is exposed to the electric field in at least one electrochemical reactor.

16. The method of claim 15, wherein the electrochemical reactor comprises:
- a housing having an upper portion and a lower portion, the upper portion defining a development chamber and the lower portion defining a reaction chamber;
- an inlet communicating with the housing at the reaction chamber to allow the flow of liquid into the housing;
- an outlet communicating with the reaction chamber to allow the flow of liquid out of the housing;
- a plurality of reaction plates disposed in the housing and extending substantially vertical within the reaction chamber, the plurality of reaction plates being spaced apart from one another creating gaps extending between adjacent reaction plates, the flow of liquid being in a flow direction upward through the gaps between the plurality of reaction plates;
- at least two reaction plate tabs integral with selected ones of the plurality of reaction plates; and,
- a source of power providing line voltage to the tabs in order to create an electrical field within the reaction chamber.

17. The method of claim 1, wherein the recovery of the biodiesel fuel comprises separating the biodiesel fuel from another component of the broken emulsion under vacuum.

18. The method of claim 17, wherein the vacuum is applied in at least one of a vacuum clarifier or vacuum distiller.

19. A method of purifying a solution of methyl esters comprising glycerin, the method comprising:
- removing the glycerin from a fluid comprising methyl esters;
- mixing the fluid comprising methyl esters with an aqueous salt solution to form an emulsion;
- exposing the emulsion to an electric field to form a broken emulsion; and,
- recovering a purified solution of methyl esters from the broken emulsion.

20. The method of claim 19, wherein the aqueous salt solution comprises an acid in sufficient quantity to lower the pH of the emulsion below pH 7.

* * * * *